Aug. 7, 1962 W. REIFF ET AL 3,048,282
ARRANGEMENT FOR LOADING BULK MATERIAL INTO COMPARTMENTS
ARRANGED ALONGSIDE EACH OTHER
Filed Dec. 7, 1959 3 Sheets-Sheet 1
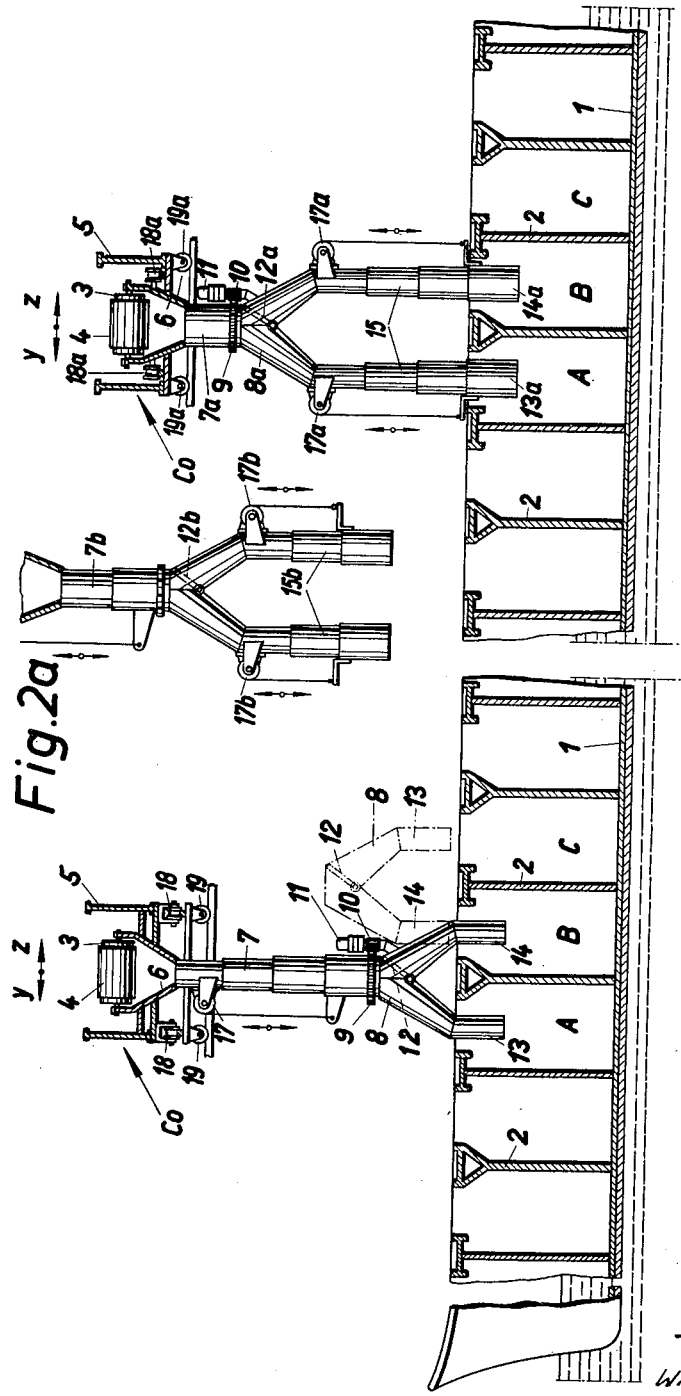
Inventors:
Wilhelm Reiff
Hans Pelzer Inventors:
Wilhelm Reiff
Hans Pelzer
By
Patent Agent

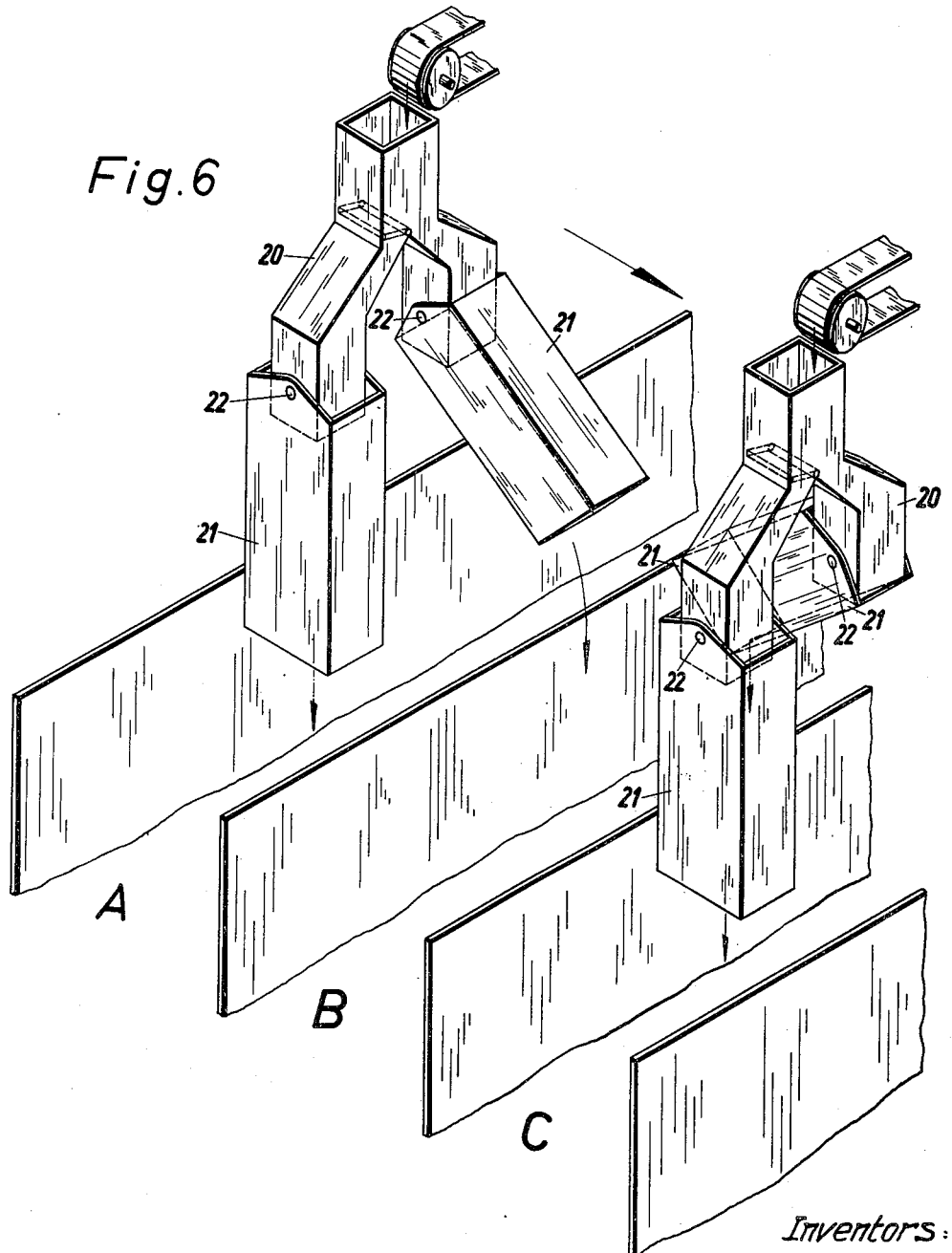

United States Patent Office 3,048,282
Patented Aug. 7, 1962

3,048,282
ARRANGEMENT FOR LOADING BULK MATERIAL INTO COMPARTMENTS ARRANGED ALONGSIDE EACH OTHER
Wilhelm Reiff, Rheinhausen, and Hans Pelzer, Krefeld, Germany, assignors to Beteiligungs- und Patentverwaltungsgesellschaft mit beschränkter Haftung, Essen, Germany
Filed Dec. 7, 1959, Ser. No. 857,732
Claims priority, application Germany Dec. 8, 1958
1 Claim. (Cl. 214—16)

The present invention relates to a loading arrangement for loading adjacent chambers with pourable goods, especially for loading ships having freight chambers formed by transverse bulkheads. Such ships are, for instance, cargo ships for hauling ore and coal as they are used on the Great Lakes and which comprise a great number of relatively narrow loading hatches extending in transverse direction over the ship.

When loading such a ship by means of ordinary conveyor installations, it is necessary, when moving from one hatch to the next hatch to stop the conveyor belt and, after the movement has been completed, again to start the conveyor belt. These numerous interruptions of the loading operation are naturally highly uneconomical. This is all the more the case since, in order to assure the floating stability of the ship, the freight chambers have to be loaded according to a certain scheme or cycle. This is carried out in such a way that each freight chamber is not completely filled in one loading step but is first filled partially only in succession with the other chambers and later on is filled completely. Therefore, the loading device has to be moved a plurality of times back and forth over the entire useful length of the ship and, consequently, rather frequently over the partitions or bulkheads between the loading chambers. To provide an individual loading device for the individual loading chambers or for a group thereof would likewise be uneconomical.

It is, therefore, an object of the present invention to provide a loading device for loading adjacent freight chambers with pourable goods, which will overcome the above mentioned drawbacks.

It is another object of this invention to provide a loading device for loading adjacent freight chambers in a continuous manner, which will be more economical than loading devices heretofore used for the above purpose.

It is still another object of this invention to provide a loading device of the above mentioned type, which is easy to handle, relatively simple in construction and will make it possible to load the respective freight chambers in a minimum of time.

These and other objects and advantages of the invention will appear more clearly from the following specification in connection with the accompanying drawing, in which:

FIG. 1 illustrates a vertical longitudinal section through a portion of the ship and illustrates a loading device of the invention for loading said ship with pourable goods.

FIG. 2 illustrates a loading device which differs from that shown in FIG. 1 in that the branched portion of the loading device has telescopic sections.

FIG. 2a shows a loading device similar to that of FIG. 2 in which also the upper portion of the loading chute has telescopic sections.

FIG. 6 illustrates in perspective a further modification of the present invention according to which the discharge sections are in the form of chutes with drop pipes suspended in pendulum manner and adapted to be tilted laterally.

Figure 5:
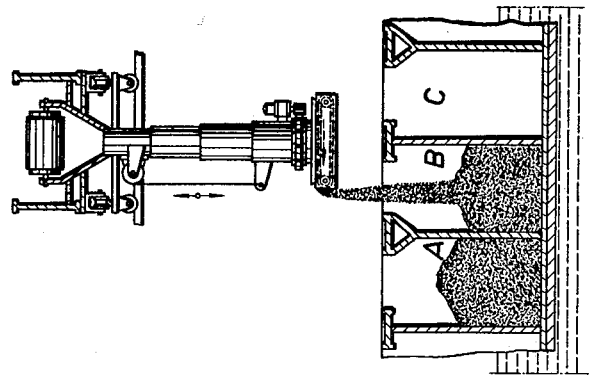
FIGS. 3 to 5 illustrate a loading device with reversible distributor belt turnable about a vertical axis, said figures also showing said distributor belt in different phases of operation.

In order to permit a continuous loading of adjacent freight chambers in an economical manner by means of a guiding device comprising the discharge end of a conveyor and adapted to be moved over the freight chambers, according to the present invention, the guiding device is provided with a distributor comprising two discharge outlets. In conformity with the invention, at least one of said outlets is movable relative to the guiding device in such a way that while one of the freight chambers is being loaded through one of said discharge outlets, the other discharge outlet may be moved from the serially preceding freight chamber to that freight chamber to be loaded following the chamber which is being loaded at the respective time. Simultaneously, the guiding device is moved in the direction toward the freight chamber to be loaded next. Preferably, the distributor is designed in a manner known per se as a two-branch chute with a tiltable gate, said gate being operable so as selectively to close one or the other branch. The said two-branch chute is rotatable relative to the guiding device about a vertical axis, while the discharge outlets or discharge sections formed by chutes are spaced from each other in such a way that the distance of the discharge outlets approximately equals the distance between the vertical center planes of two adjacent freight chambers.

Referring now to the drawing in detail and FIG. 1 thereof in particular, FIG. 1 shows the bottom 1 of a ship having mounted thereon transverse bulkheads 2 which, together with the bottom of the ship, define a plurality of substantially parallel cargo chambers. Arranged above the ship and in spaced realtionship thereto is a conveyor installation generally designated Co which comprises a frame 5, drums 3 (one only namely the drum at the discharge end, being shown) and a conveyor belt 4. Frame 5 is movable in longitudinal direction of the ship as indicated by the arrows y and z, f.i. by means of rolls 19. Preferably, frame 5 is also movable in transverse direction of the ship, i.e. parallel to the bulkheads 2, f.i. by means of rolls 18. Below the discharge end of the conveyor belt 4 there is arranged a charging funnel 6 which has connected thereto a drop pipe 7. The lower end of drop pipe 7 has mounted thereon a distributor or two-branch chute 8 which, by means of a ball ring or the like, is turnable about a vertical axis. To this end, the lower end of drop pipe 7 has connected thereto a gear ring 9 which is engaged by a pinion 10 mounted on said distributor 8 and adapted to be driven by a motor 11. Within said distributor or branch chute 8, there is arranged a tiltable gate 12 which is movable selectively into one or another position for selectively closing off one or the other branch of chute 8. The center points of the discharge sections 13, 14 of chute 8 are spaced from each other by a distance substantially equalling the distance betwen the vertical central transverse planes of two adjacent cargo chambers as for instance chambers A and B. The discharge sections 13 and 14 may selectively be raised or lowered. According to the embodiment shown in FIG. 1, this raising and lowering of the discharge sections 13 and 14 is effected together with the branch chute 8. To this end, drop pipe 7 is designed in the manner of a telescope.

In the arrangement of FIG. 1, the tiltable gate 12 has been titled toward the right (with regard to FIG. 1) so that the freight chamber A will be loaded through the left-hand discharge section 13. The other discharge section 14 extends into the adjacent charging chamber B. When chamber A has been loaded to the desired extent, the tiltable gate 12 is shifted toward the left so that the goods to be loaded will now pass through discharge section 14 into freight chamber B. During the loading of freight chamber B, the discharge section 13 is to be moved into a position in which it will be ready to load the freight chamber C which is to be loaded after freight or cargo chamber B. The cargo chambers may also be called cargo compartments.

In order to bring discharge section 13 into readiness for cargo or freight chamber C at the desired time, branch chute 8, f.i. by means of a winch 17, is first raised to such an extent that the mouth of the discharge sections 13 and 14 will be located at a level higher than the upper edges of the transverse bulkheads 2. Thereupon, without interrupting the loading of freight chamber B through discharge section 14, frame 5 of the conveyor installation is moved toward the right (with regard to FIG. 1) while simultaneously therewith the branch chute or distributor 8 is turned in such a way that the center of discharge section 14 will remain approximately in the transverse central plane of freight chamber B. Discharge section 13 is moved above the bulkheads 2 between freight chambers A and B and freight chambers B and C until it has reached the position shown in FIG. 1 by dot-dash lines. After the distributor has reached the said dot-dash line position, it may be lowered again so that the discharge sections 14 and 13 extend into the freight chambers B and C respectively.

When freight chamber B has been loaded to the desired extent, the gate 12 is tilted toward the left considering the dot-dash position of distributor 8 in FIG. 1 so that now freight chamber C will be charged through discharge section 13.

The arrangement shown in FIG. 2 is somewhat similar to that of FIG. 1 and, accordingly, similar parts have been designated with the same reference numerals. The arrangement of FIG. 2 differs, however, from that of FIG. 1 in that the drop pipe 7a is considerably shorter than the telescopic drop pipe 7 of FIG. 1, whereas the distributor 8a in contrast to the distributor 8 of FIG. 1 has its branches 15 designed as telescopically adjustable pipes. In view of this arrangement, the discharge sections 13a and 14a of the distributor 8a which form parts of the telescopically designed branches 15 can be raised or lowered individually, f.i. by means of winches 17a. The operation of the arrangement of FIG. 2 fully corresponds to that of FIG. 1 described above.

From the above, it will be evident that by means of a loading arrangement according to the present invention, it is possible at any desired scheme to move the loading device over the various freight chambers in succession without interrupting the loading operation.

It is, of course, to be understood that the present invention is, by no means, limited to the particular constructions shown in the drawing, but also comprises any modifications within the scope of the appended claim.

Thus, while FIG. 1 shows a telescopic drop pipe 7 but no telescopically designed distributor, and while FIG. 2 shows a telescopically designed distributor 8a but no telescopic drop pipe 7a, it is, of course, also possible to provide an arrangement with both a telescopically designed drop pipe and a telescopically designed distributor, see FIG. 2a.

Furthermore, in order to permit a movement of the distributor 8 or 8a in a direction transverse to the longitudinal direction of the ship, it is also possible instead of making frame 5 movable in said transverse direction of the ship, to make the conveyor drum 3 together with the charging funnel 6 adjustable in said transverse direction within said frame 5, f.i. by means of rolls 18a, as shown in FIG. 2.

Figure 4:
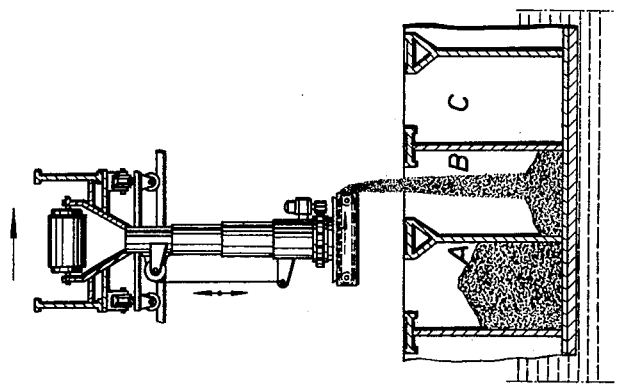
Figure 3:
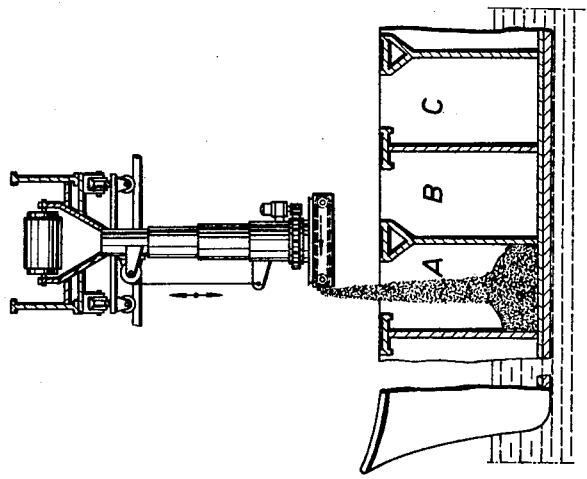

Furthermore, instead of providing a two-branch distributor as shown in the drawing, the distributor may also be designed differently for instance in the form of a reversible distributor belt turnable about a vertical axis, as shown in FIG. 3 to 5. It is also possible to make only one of the two discharge sections, which may, for instance, be designed as a discharge belt, turnable about a vertical axis relative to the distributor.

It may furthermore be mentioned that it is not under all circumstances necessary that the discharge sections are rotated about vertical axes relative to the distributor. Instead, other movements of the discharge sections relative to the distributor, for instance pendulum movements or displacements transverse to the bulkheads may be provided for; see FIG. 6.

This figure shows a branch chute 20 with two drop pipes 21 which are attached to two outlet chutes of the branch chute 20 by means of horizontally arranged link bolts 22, in two positions relative to the chambers A, B and C.

What we claim is:

In combination in an arrangement for loading bulk material into a plurality of compartments arranged one behind the other when looking in a certain direction: conveying means for receiving and conveying bulk material into said compartments, distributor means arranged to receive material to be loaded from said conveying means and adapted to discharge said material into said compartments, frame means carrying the discharging end of said conveying means and said distributor means and movable in said certain direction, said distributor means comprising two discharge sections spaced from each other by a distance at least approximately equalling the distance between the major central planes of two adjacent compartments to be loaded, said discharge sections being rotatable about a common vertical axis, each of said discharge sections being adapted in cooperation with the movement of said frame means in said certain direction to rotate about the other discharge section whereby one of said discharge sections is movable from a position above a first compartment directly preceding the compartment above which the other discharge section is located to a position above a third compartment directly succeeding said last mentioned compartment while said other discharge section remains over its respective compartment between said first and said third compartment, said distributor means comprising a chute having its upper end arranged below one end of said conveying means and having its lower end provided with two branches forming said two discharge sections, and gate means near the lower end of said chute and said branches and operable selectively alternately to close one of said branches.

References Cited in the file of this patent

UNITED STATES PATENTS

| | | |
|---|---|---|
| 488,304 | Best | Dec. 20, 1892 |
| 1,442,521 | Case | Jan. 16, 1923 |
| 2,215,736 | Jones | Sept. 24, 1940 |
| 2,298,119 | Gebert | Oct. 6, 1942 |
| 2,868,400 | Powischill | Jan. 13, 1959 |

FOREIGN PATENTS

| | | |
|---|---|---|
| 642,706 | Germany | Mar. 12, 1937 |
| 668,328 | Germany | Nov. 30, 1938 |